United States Patent
Han et al.

(10) Patent No.: US 11,100,158 B1
(45) Date of Patent: Aug. 24, 2021

(54) FAST FEATURE SELECTION FOR SEARCH MODELS

(71) Applicant: A9.com, Inc., Palo Alto, CA (US)

(72) Inventors: Cuize Han, San Jose, CA (US); Nikhil Rao, San Jose, CA (US); Daria Sorokina, San Carlos, CA (US); Karthik Subbian, Fremont, CA (US)

(73) Assignee: A9.COM, INC., Palo Alto, CA (US)

( * ) Notice: Subject to any disclaimer, the term of this patent is extended or adjusted under 35 U.S.C. 154(b) by 170 days.

(21) Appl. No.: 16/398,981

(22) Filed: Apr. 30, 2019

(51) Int. Cl.
*G06F 16/535* (2019.01)
*G06N 20/20* (2019.01)
*G06F 16/583* (2019.01)
*G06F 16/587* (2019.01)
*G06N 3/08* (2006.01)

(52) U.S. Cl.
CPC .......... *G06F 16/535* (2019.01); *G06F 16/587* (2019.01); *G06F 16/5846* (2019.01); *G06N 3/08* (2013.01); *G06N 20/20* (2019.01)

(58) Field of Classification Search
CPC .. G06F 16/535; G06F 16/587; G06F 16/5846; G06N 20/20; G06N 3/08

USPC ........................................................ 707/706
See application file for complete search history.

(56) References Cited

U.S. PATENT DOCUMENTS 9,881,226 B1 * 1/2018 Rybakov ............ G06K 9/00201
2016/0078361 A1 * 3/2016 Brueckner ............ H04L 67/10
706/12

* cited by examiner

*Primary Examiner* — Evan Aspinwall
(74) *Attorney, Agent, or Firm* — Hogan Lovells US LLP

(57) ABSTRACT

Various embodiments provide for selecting a subset of features to use to train a model for search applications. To select a feature, the candidate features are randomly assigned into two groups. Each of the two groups represents a summation of the respective features that were assigned to it. Then a decision tree building scan is performed on the two groups to determine which of the two groups performs better based a selection criteria. Upon determining which of the two groups is better, the candidate features of the winning group are again randomly assigned into two groups. These two groups are again scanned as described above to determine a winning group. This binary splitting and scanning pattern is continuously performed until the winning group contains one remaining feature. That remaining feature is then designated as a selected feature to be used in the search model.

20 Claims, 9 Drawing Sheets

FAST FEATURE SELECTION FOR SEARCH MODELS

BACKGROUND

An increasing amount of computer-based processing is being performed using statistical models, such as trained machine learning models. For example, in the e-commerce space, search models are often used to select and rank products to show a customer in response to a search query. Search models use a number of features to make decisions and are typically trained using a set of training data. Many data sets involve a large number of features. However, using such a large number of features at run time may cause high latency, and degrade the user experience. Because search systems often have strong latency requirements, a smaller subset of features may be used at run time, which reduces the amount of latency. However, there may be a quality and accuracy tradeoff when the number of features is reduced. Thus, feature selection is a challenging and important aspect of training and deploying search models.

BRIEF DESCRIPTION OF THE DRAWINGS

Various embodiments in accordance with the present disclosure will be described with reference to the drawings, in which.

DETAILED DESCRIPTION

Figure 1A:
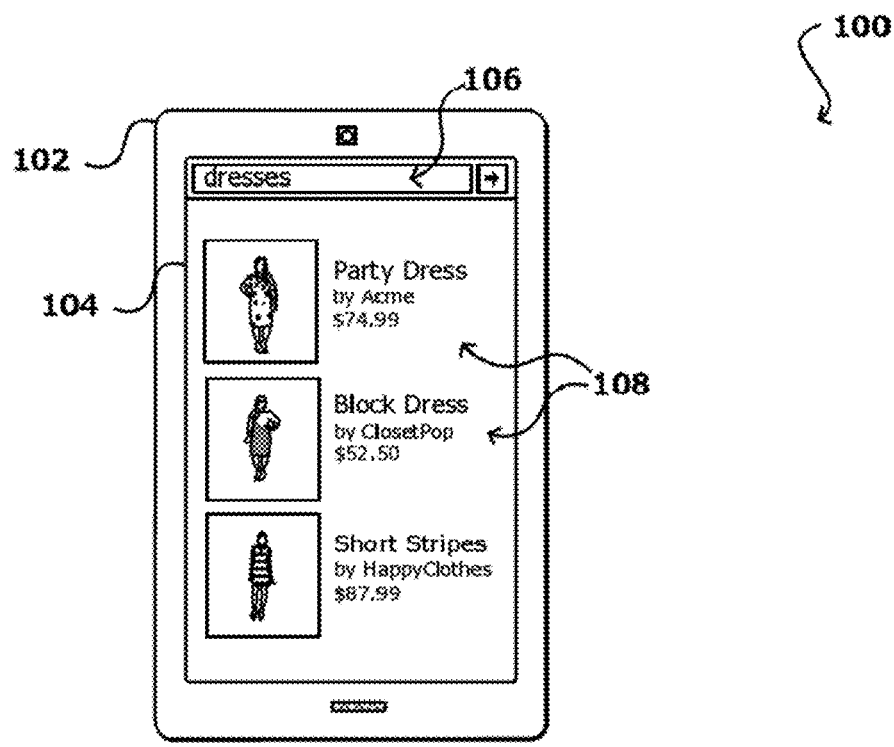
FIGS. 1A and 1B illustrate an example computing device providing access to an electronic marketplace.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the selection of features for a search model. In particular, the selection techniques attempt to reduce the amount of data to be processed by selecting the features that will likely be of most value for the search model without individually scanning each possible feature. Specifically, various embodiments provide for selection techniques that allow for a target number of the best features to be selected using a binary, or logarithmic, search approach, which is faster and more reliable than conventional methods of feature selection.

When training a search model, a large set of training data is used, in which the training data is associated with a number of features that can be used to build a decision tree. For example, there may be hundreds or thousands of features, depending on the particular application and data involved. However, in order to meet latency requirements of search system, only a small subset of the total available features will be used at run time. According to example embodiments of the present disclosure, a maximum number of features to use in a search model can be determined based on a latency requirement or threshold, which may be on the magnitude of milliseconds for example. The relationship between the number of features used and latency can be determined through testing, an algorithm, or is already known. In some embodiments, fewer than the maximum number of features may be enough to deliver high quality search results. In such cases, fewer than the maximum number of features may be selected and used. The features to be used are selected from the set of total available features, also called candidate features. To select a feature, the candidate features are randomly assigned into two groups. In some embodiments, the candidate features are divided as evenly as possible. Each of the two groups represents a summation of the respective features that it contains. In other words, a group containing a plurality of feature is treated as a feature that includes all of the features that are assigned to that group. A decision tree-building scan is then performed on the two groups to determine which of the two groups performs better based on one or more selection criteria. For example, in some embodiments, the selection criteria may include a mean squared error metric. Essentially, the scans are used to determine which of the two groups represents a better feature to use in the decision tree.

Upon determining which of the two groups performs better in the scans, the candidate features of the winning group are again randomly assigned into two groups. These two groups are again scanned as described above to determine a winning group. This binary splitting and scanning pattern is repeatedly performed until the winning group contains one remaining feature. That remaining feature is then designated as a selected feature to be used in the search model. All of the other unselected candidate features are recombined and then again put through this binary splitting and scanning process to select another feature. This process is repeated until the target number of features has been selected. For example, this process is repeated twenty times to select twenty features to use in the search model. The selected features are used to train the search model. The same features are also used at run time to process a query and return search and/or ranking results using the model.

Another complicating factor in feature selection is that the optimal features may not be consistent across different search categories. A single global search model using a certain set of selected features may not generalize across different markets (e.g., product categories, geography). For example, a search model with a certain set of features may perform well for search queries directed to cosmetics but perform poorly when the search query is directed to power tools. Thus, conventionally, models for different markets may be trained independently and feature selection may be performed separately for different markets. Embodiments of the present disclosure provide techniques that attempt to reduce the total amount of computation resources and time needed to select features across different markets. Although different features may be important in different markets, there may also be some features that are important across some markets. Present embodiments identify and utilize such shared features across markets to reduce the total amount of feature scanning required in training the models. Specifically, in some embodiments, the technique described above may be performed for a particular market to determine the selected features. When similarly selecting features for other markets, the features that were selected for the first market are given an artificial boost during the scans, which increases the feature's likelihood of being selected for the other markets as well. The amount of boost given to a feature increases in the likelihood that it will be selected. Thus, the model can be artificially biased to share more or fewer features by controlling the amount of bias given to the previously selected features.

The techniques provided herein increase training speed and can be utilized for various types of data sets, including both text and image data, for example. Given that some conventional training tasks may take several hours, or even days, to train on expensive GPU-inclusive machines, an increase in training speed can lead to substantial savings in computation time and reduction in resource capacity required. Such approaches can be used for statistical models and algorithms other than those related to machine learning, as would be apparent in light of the teaching and suggestions contained herein.

Figure 1B:
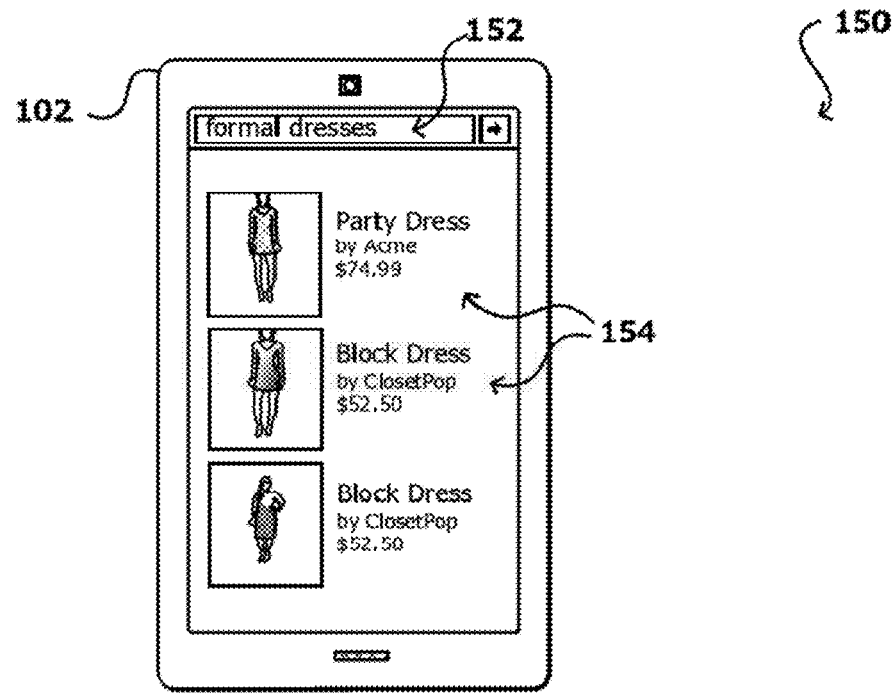

FIGS. 1A and 1B illustrate an example 100 computing device 102 providing access to an electronic marketplace 104, in accordance with various embodiments. Although a tablet computing device is shown in this example, it should be understood that various other types of electronic device that are capable of determining and processing input can be used in accordance with various embodiments discussed herein. These devices can include, for example, smart phones, e-book readers, desktop computers, notebook computers, personal data assistants, video gaming consoles or controllers, smart televisions, and portable media players, wearable computers (e.g., glasses, watches, etc.) among others. Further, the components illustrated can be part of a single device, while at least some components illustrated and otherwise utilized for such a device can be provided as one or more peripheral devices or accessories within the scope of the various embodiments.

In a conventional system, a user can search for items (goods and/or services) in an electronic item catalog of an electronic marketplace. A catalog of items (including each item's description) may be organized into a "browse tree" structure in order to facilitate searching. A browse tree permits users to "browse" through various items, which are arranged in the form of a hierarchical tree. The browse tree may be displayed via a user interface as a collection of hyperlinks, each hyperlink corresponding to a section of the tree. A user can find an item by navigating through the various nodes of the browse tree.

Additionally, in many situations, the electronic marketplace may provide a search interface 106 that enables a user to search for a target item. The search interface may return search results based on relevance of particular items to the customer's search query. For example, FIG. 1A illustrates an example display of content on a display screen 104 of a computing device 102. In this example, a search query has been received and a set of search results 108 determined and returned for presentation in response to the request. In this example, the user has submitted a query including the keyword "dresses" and the returned search results have been determined to be relevant in some way to the keyword. This can be due to a categorization of the results, keywords associated with the results, or tags applied to the result, among other such options. The user can scroll or otherwise navigate through the results to determine whether any of the results are of interest to the user.

It might be the case, however, that there were too many results returned and the user is not finding items of interest in an initial subset of the results. Accordingly, the user might want to narrow the query in order to obtain search results that are more relevant or of interest to the user based on the user's current interest. For example, FIG. 1B illustrates example 150 of an updated set of search results 154 returned for a new query 152 that specifies "black dresses." Similarly, if the user would like a different type of dress, the user might want to modify the query in some way. For example, if the user had originally submitted a query such as "cocktail dresses" but is instead interested in results that are less formal, the user would need to submit a query that describes a different type of dress, such as summer dresses.

When a user submits a search query, such as shown in FIGS. 1A and 1B, various processes are performed in order to produce a list of search results that are relevant to the search query. In some embodiments, the search results may also be ranked or arranged in a particular manner, such as by descending relevance or mixed relevance. In some search systems, a trained search model may be used to determine which products to show in response to a certain search query. When training a search model, a large set of training data is used, in which the training data is associated with a number features that can be used to build a decision tree that is used to determine which products to show in response to a query. For example, there may be hundreds or thousands of features, depending on the particular application and/or data involved. However, in order to meet latency requirements of search system, only a small subset of the total available features will be used at run time. Traditional approaches for selecting the top features are either suboptimal in terms of performance or take prohibitively long.

Gradient boosted decision trees (GBDT) are commonly used for building relevance and ranking models for use in search and recommendation applications. Feature selection in GBDT models typically involve ranking the features by importance, and selecting the top few features, or by performing a full backwards feature elimination routine. Typical methods for feature selection in GBDT models involve fitting the model on all available features, ranking the features by importance, and selecting a certain number of top-ranked features. However, these methods require all the available features to be scanned, which requires a large amount of processing time and resources, especially when there is a large number of features available. Techniques of the present disclosure provide for selecting features utilizing a binary or logarithmic scan through the available features rather than employing a linear scan, thereby providing significant time and processor savings.

Figure 2:
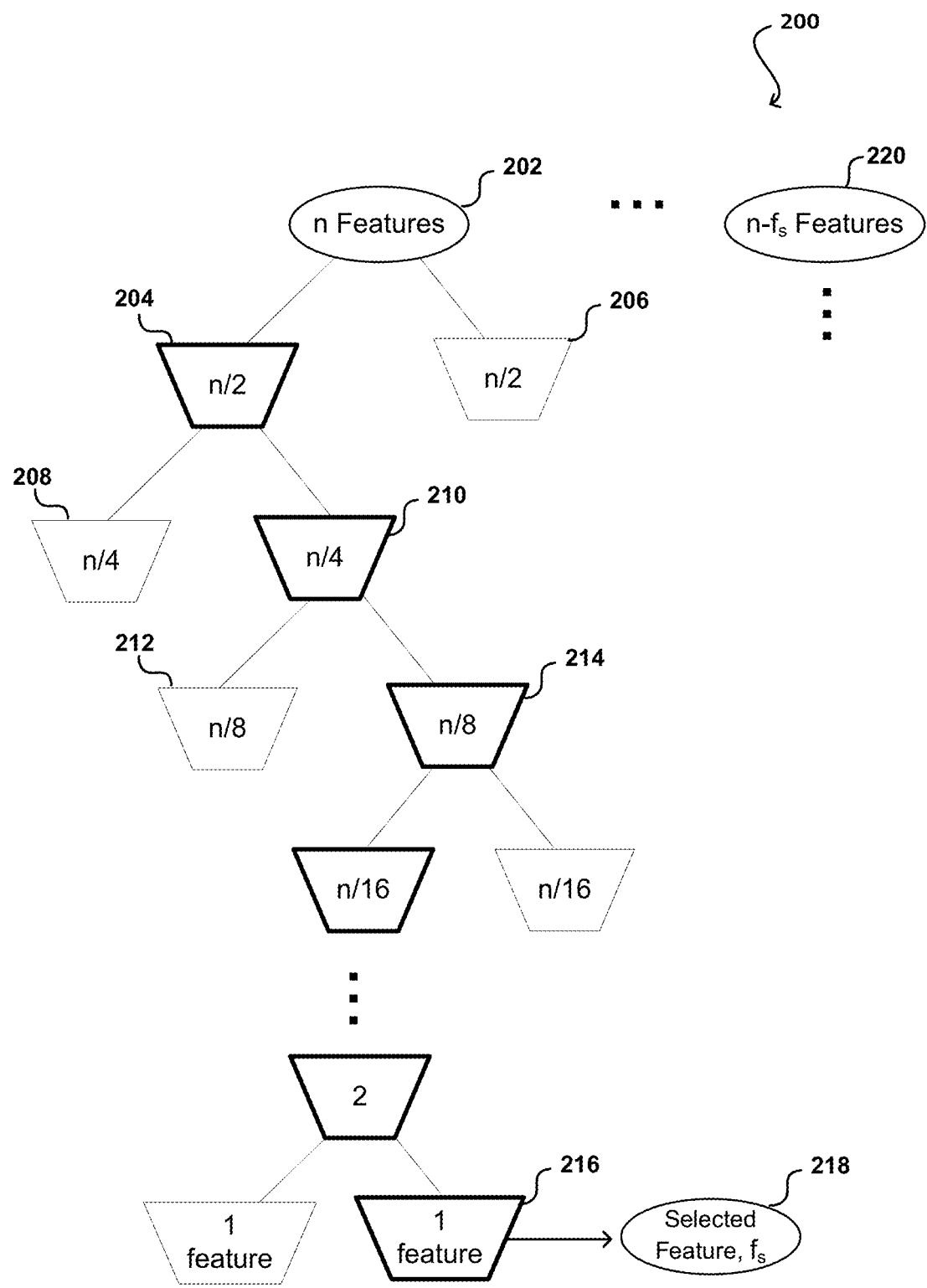
FIG. 2 illustrates a binary scanning approach for feature selection, in accordance with various embodiments of the present disclosure.

FIG. 2 illustrates a binary scanning approach 200 for feature selection, in accordance with various embodiments of the present disclosure. When training a search model, a large set of training data is used, in which the training data is associated with a number features that can be used to build a decision tree. For example, there may be hundreds or thousands of features, depending on the particular application and data involved. However, in order to meet latency requirements of search system, only a small subset of the total available features will be used at run time. According to example embodiments of the present disclosure, a maximum number of features to use in a search model can be determined based on one or more performance metrics, such as a latency requirement or threshold. For example, an acceptable latency may be on the magnitude of milliseconds for example. The relationship between the number of features used and latency can be determine or known. Thus, the maximum number of features to use given a certain maximum latency time can be determined. The features to be included are then selected from the set of total available features 202, also called candidate features.

To select a feature, the candidate features 202 are randomly assigned into two groups 204, 206. In some embodiments, the candidate features are divided as evenly as possible such that each group 204, 206 includes roughly half of the candidate features. For example, if there is an even number of candidate features, the candidate features are divided evenly into the two groups. If there is an odd number of candidate features, then one of the two groups will have one more candidate feature than the other. In some embodiments, the candidate feature may not be divided evenly, and one group may have more candidate features than the other. Each of the two groups represents a summation of the respective features that were assigned to it. In other words, a group containing a plurality of feature is treated as a feature that includes all of the features that are assigned to that group. A decision tree-building scan is performed on the two groups 204, 206 to determine which of the two groups 204, 206 performs better based a selection criteria. For example, in some embodiments, the selection criteria may include a mean squared error metric. Essentially, the scans are used to determine which of the two groups 204, 206 represents a better feature to use in the decision tree. In the illustrated example, group 204 is selected as the better group.

Upon selecting one of the two groups 204, 206, the candidate features of the selected group 204 are again randomly assigned into two further groups 208, 210. These two groups 208, 210 are again scanned as described above to select a winning group 210. In some embodiments, the candidate features of the selected group 210 are again randomly assigned into two further groups 212, 214. These two groups 208, 210 are again scanned as described above to select the winning group 214. This binary splitting and scanning pattern is repeatedly performed until the selected group 216 contains one remaining feature. That remaining feature is then designated as a selected feature 218 to be used in the search model. In order to select additional features to be used with the search model, the selected feature is removed from the candidate features. All of the other unselected candidate features 220 are recombined and again put through this binary splitting and scanning process to select another feature. This process is repeated until the target number of features has been selected. For example, this process is repeated twenty times to select twenty features to use in the search model. The selected features are then used to train the search model. The same features are also used at run time to process a query and return search and/or ranking results using the model. This technique reduces the total number of computations that would otherwise have to be performed to accomplish the same result, thus improving the computational performance of any system on which it is implemented.

Although the present embodiment illustrates a binary search approach in which candidate features are split into two groups at each scan level, in some embodiments, the candidate may be split into more than two groups. For example, for each scan level, the candidate features in a selected group may be split into three groups.

Figure 3:
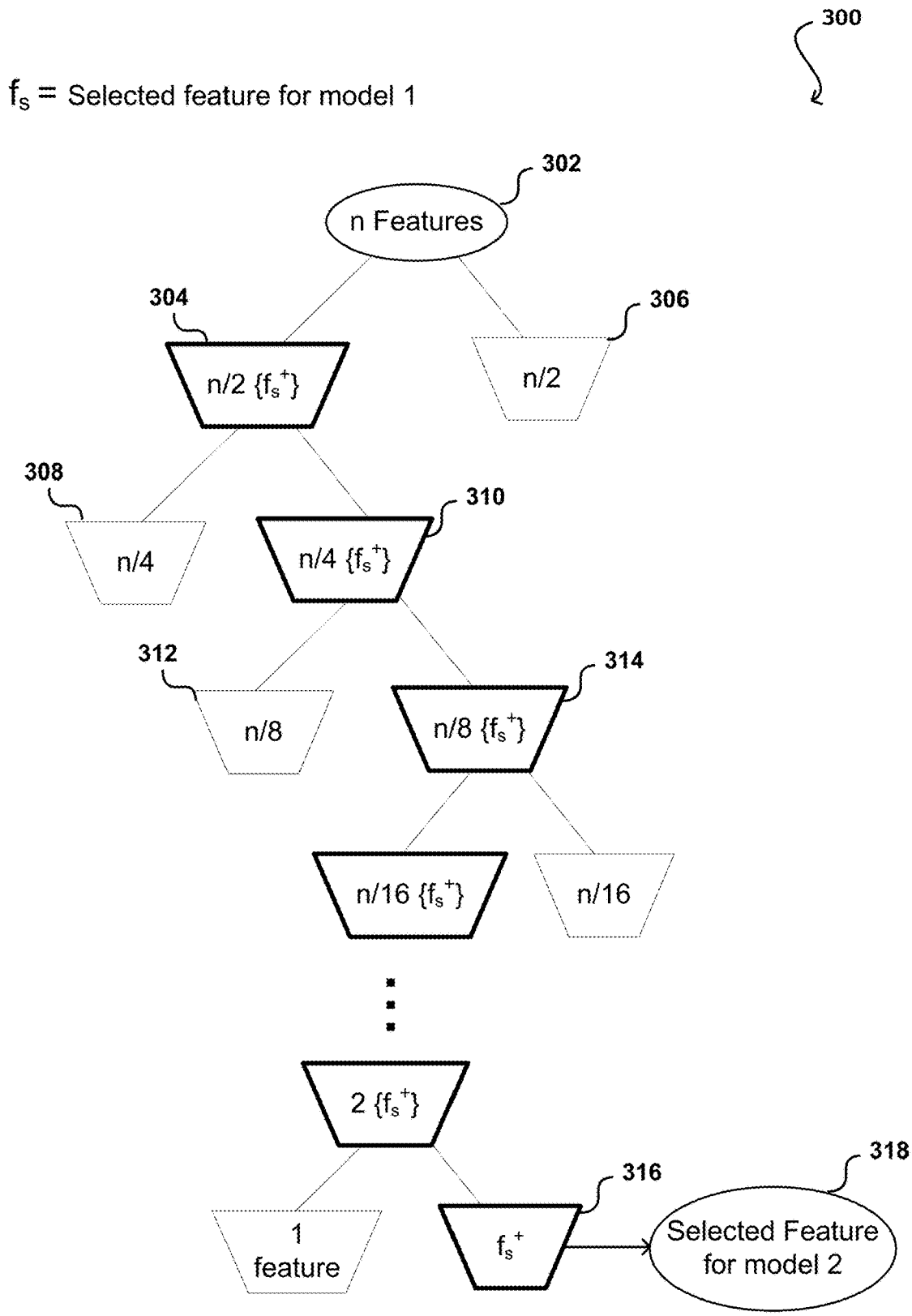
FIG. 3 illustrates a binary scanning approach for efficient feature selection across multiple markets, in accordance with various embodiments of the present disclosure.

FIG. 3 illustrates a binary scanning approach for efficient feature selection across multiple markets, in accordance with example embodiments of the present disclosure. As mentioned, another complicating factor in feature selection is that the best features may not be consistent across different search categories. A single global search model using a certain set of selected features may not generalize across different markets (e.g., product categories, geography). Thus, conventionally, different models for different markets may be trained independently and feature selection may be performed separately for different markets. Embodiments of the present disclosure provide techniques that attempt to reduce the total amount of computation and time needed to select features across different markets. Although different features may be important in different markets, there may also be some features that are shared across some markets. Present embodiments identify and utilize such shared features across markets to reduce the total amount of feature scanning required in training the models. Specifically, in some embodiments, the technique described above may be performed for a particular market to determine the selected features. When similarly selecting features for other markets, the features that were selected for the first market are given an artificial boost during the scan, which increases the feature's likelihood of being selected for the other markets as well. The amount of boost given to a feature increases the likelihood that it will be selected. Thus, the model can be artificially biased to share more or fewer features by controlling the amount of boost given to certain previously selected features. This technique further reduces the total number of computations that would otherwise have to be performed to accomplish the same result, thus improving the computational performance of any system on which it is implemented.

Specifically, referring to FIG. 3, a feature, $f_s$, selected for training a first model is obtained. The first model may be associated with a first market. A plurality of candidate features 302 for a second model are assigned into two different groups 304, 306. The second model is associated with a second market different from the first market. The candidate features 302 for the second model may be the same set of features as the candidate features 202 (FIG. 2) of the first model, or different with overlapping features. The candidate features 302 for the second model at least includes the feature selected for the first model, $f_s$. A decision tree-building scan is performed on the two groups 304, 306 to determine which of the two groups performs better based on a selection criteria. In doing so, a performance metric of the feature selected for the first model, $f_s$, is artificially augmented to increase the likelihood that it will end up as a selected feature for the second model. Decision tree-building scans are performed on the two groups 304, 306 and the group that performs better 304 in the decision tree-building scans is selected. Since the feature that was already selected for the first model, $f_s$, is given an advantage (e.g., augmented metric), the scan is biased to select the group 304 that has that feature, $f_s$, as the better performing group. This occurs in the illustrated example. However, the selected group may or may not be the one having the feature selected for the first model.

Upon determining which of the two groups is better, the candidate features of the selected group 304 are again randomly assigned into two further groups 308, 310. These two groups 308, 310 are again scanned as described above to select the better group 310. In some embodiments, the candidate features of the selected group 310 are again randomly assigned into two further groups 312, 314. These two groups 312, 314 are again scanned as described above to select the better group 314. This binary splitting and scanning pattern is continuously performed until the selected group 316 contains one remaining feature. The augmented performance metric of the feature that was already selected for the first model, $f_s$, stays with the feature throughout the multiple scans. However, as mentioned, it may be the case that the feature $f_s$, is eliminated at some point. Regardless, the remaining feature 316 is designated as a selected feature 318 to be used in the search model. In the illustrated embodiment, the feature that was already selected for the first model, $f_s$, ends up being the selected feature. However, in other embodiments, another feature may end up being the selected feature. The amount of augmentation can be determined based on how aggressively the features are to be shared.

Figure 4:
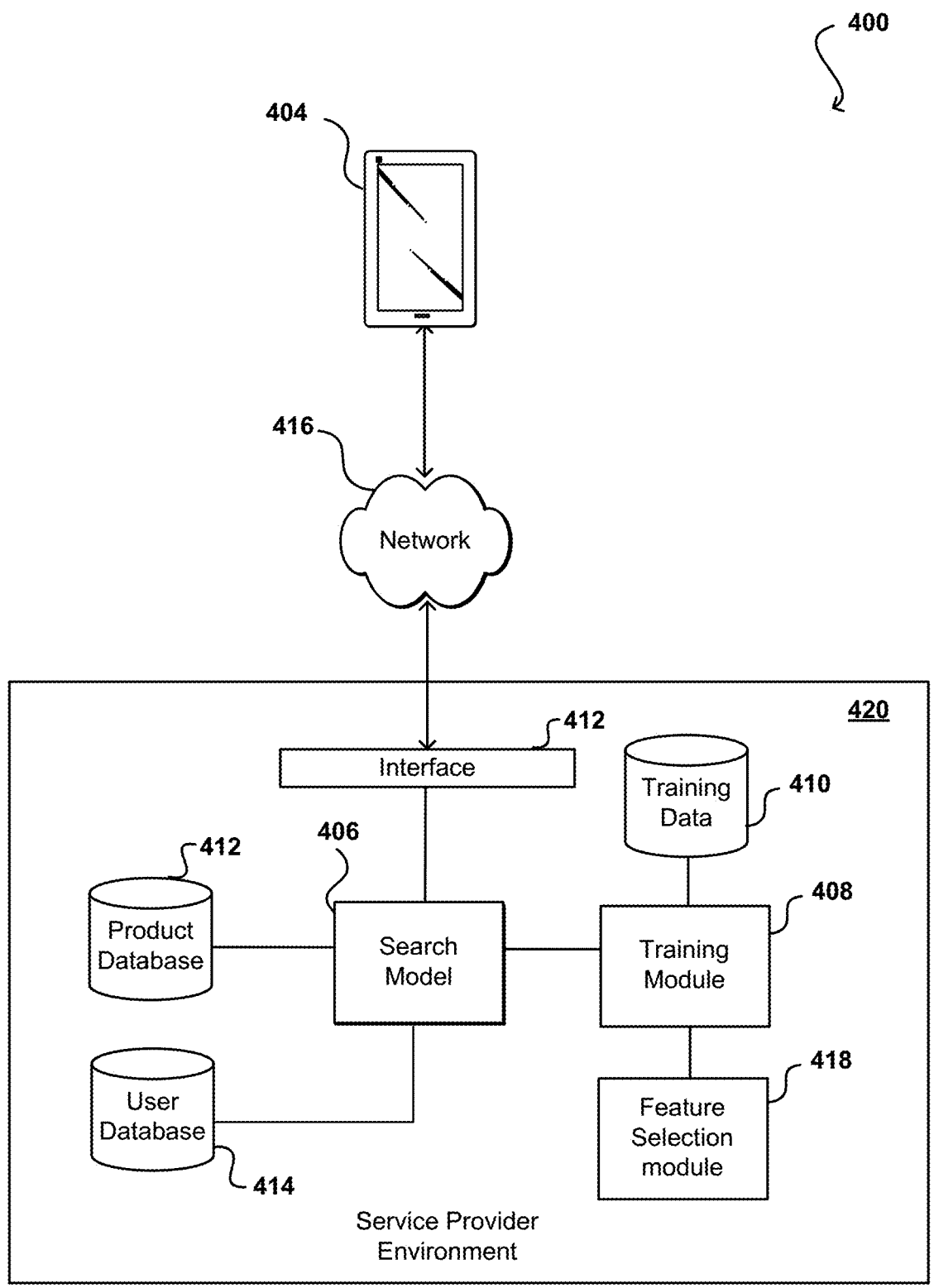
FIG. 4 is a diagram illustrating an example representation of a search system in which the present feature selection technique is implemented, in accordance with various embodiments of the present disclosure.

FIG. 4 is a diagram illustrating an example representation of a search system 400 of a service provider environment 420 in which the present feature selection technique is implemented, in accordance with various embodiments. In an example application, the search system 400 is used to search for products in an electronic store or catalog. In other example applications, the search system 400 may be used to search for digital content, recommendations, among others. The system 400 includes an interface 402 for facilitating communication with a user device 404 used to conduct a search. The interface 402 receives search parameters (e.g., keywords, selections) entered by the user and generates a search request to be processed by the search system 400. The interface 402 may include any appropriate components known or used to receive requests from across a network 416, such as may include one or more application programming interfaces (APIs) or other such interfaces for receiving such requests. The interface 402 might be owned and operated by the service provider, or leveraged by the service provider as part of a shared resource or "cloud" offering. The network interface layer can receive and analyze the requests from the computing device, and cause at least a portion of the information in the requests to be directed to an appropriate system or service associated with the search system 400. For example, when a user accesses an application on a user device 404 to request content (e.g., submit a search), the user device 404 may establish a connection with the search system 400. The user device 404 may receive content via the interface 402. The content may include network resources such as Web pages, content posts, lists, documents, images, videos, and the like. A user of the user device 404 can interact with the content by activating links to other content, submitting search queries, initiating the purchase of items referenced in the content, etc. Information regarding user interactions with the content can be transmitted to the search system 400 for processing. In addition, information regarding the interactions, or some subset thereof, may be stored for use in training and/or adjusting any appropriate machine learning approaches. As mentioned, the interface 402 generally facilitates communications between the search system 400 and the user device 404, both receiving searches from the user device 404 and delivering search results to the user device 404. Specifically, the interface 402 delivers the search request to the search model 406, where the search request is processed to determine the content to be delivered to the user device 404 as search results.

The model 406, upon receiving a search request, selects one or more items from a product database 412 to provide as search results. In some embodiments, the model 406 also ranks the products by relevance, a mixed relevance order, or other ranking scheme. In some embodiments, the search model 406 may include a decision tree built during a training process. The product database 412 includes all the items available and the attributes of each items. The attributes may include product data such as price, availability, vendor, shipping method, brand, descriptive text, style, material, color, among many others. Different items may have different types of attributes. The attributes may also include product statistics, such as total purchases, page views, among many others. The model 406 may utilize one of more of these attributes to determine which products to include in the search results, based at least in part on the training data on which the model 406 was trained. In some embodiments, a model may be generated for markets that may be served by the search system 400. For example, a first model may correspond to the United States and Canada, a second model may correspond to India, and so forth. In some embodiments, the search model 406 accesses a user database 414. The user database 414 stores data about individual users, including information regarding interests, demographic characteristics, user preferences, content interaction (e.g., clicks, likes, shares) and purchasing history, etc. This information may be used to further qualify and refine the search results.

The system further includes a training module 408 for training the search model 406. In order to select optimal products to present in response to search, the search model 406 is trained. The model 406 may be initially trained before it is deployed. The training module 408 accesses a training database 410 that includes training data used to train the search model 406. In some embodiments, the training data includes historical information of searches conducted by users and their engagement with the search results, as well as attributes of the search results and user data. For example, a data point in the training data may be a search conducted by a user with the search terms "lightweight sneakers", the search results that the user clicked on, saved, added to cart, purchased, etc., and information about those search results, such as price, description, availability, images, etc. The data point may also include the user's demographic data, general engagement behavior, and the like. The training data may include a large number of such data points, so that the model can be trained to optimize for user engagement. In other words, the search model 406 is optimized to select products that will draw high engagement from the user, which means that the results are highly relevant.

The model 406 may also be retrained with updated training data or selected features on a regular basis (e.g., every week, every month). The model 406 may also be retrained upon certain triggers, such as newly added products or markets, among other events. As mentioned, the amount of information that is available for training the model 406 may be immensely large, and using all of that information would make for a very slow training process as well as slow performance when a user conducts a search. Such information makeup a large set of features. In order to increase the speed of both training and front-end performance, a subset of the features are selected and used to train the model. In other words, although a data point in the training data may have a large number of features, only the selected features of the data point are used in the training, and the model will only consider the selected features when used to serve search results in response to a search query. This results in a much faster search response and thus better user experience. However, the quality of the search results may depend on which features were used in the model. The present techniques provide for the decreased search time while still optimizing for selecting the best features that produce the most relevant search results. The feature selection module 418 performs feature selection in order to determine the best subset of the available features to use to train the model 406. According to example embodiments of the present disclosure, a maximum number of features to use in the search model 406 can be determined based on a latency requirement or threshold, which may be on the magnitude of milliseconds for example. The relationship between number of features used and latency can be determine or known. Thus, the maximum number of features to use given a certain maximum latency time can be determined. The features to be included are then selected from the set of total available candidate features.

To select a feature, the candidate features are randomly assigned into two groups. Each of the two groups represents a summation of the respective features that were assigned to it. In other words, a group containing a plurality of feature is treated as a feature that includes all of the features that were assigned to that group. Then a decision tree building scan is performed on the two groups to determine which of the two groups performs better based a selection criteria. For example, in some embodiments, the selection criteria may include a mean squared error metric. Essentially, the scans are used to determine which of the two groups represents a better node to use in a decision tree. Upon determining which of the two groups is better, the candidate features of the winning group are again randomly assigned into two groups. These two groups are again scanned as described above to determine a winning group. This binary splitting and scanning pattern is repeatedly performed until the winning group contains one remaining feature. That remaining feature is then designated as a selected feature to be used in the search model 406. All of the other unselected candidate features are recombined and then again put through this binary splitting and scanning process to select another feature. This process is repeated until the target number of features has been selected. For example, this process is repeated twenty times to select twenty features to use in the search model. The selected features are then used to train the search model. The same features are also used at run time by the search model 406 to process a search query and return search and/or ranking results.

As mentioned above, different models may be used for different product categories or different markets. This is because different features may be important for these different markets. Although different features may be important in different markets, there may also be some features that are important across some markets. Present embodiments identify and utilize such shared features across markets to reduce the total amount of feature scanning required in training the models. Specifically, in some embodiments, the technique described above may be performed for a particular market to determine the selected features. When similarly selecting features for other markets, the features that were selected for the first market are given an artificial boost during the scan, which increases the feature's likelihood of being selected for the other markets as well. The amount of boost given to a feature increases in the likelihood that it will be selected. Thus, the model can be artificially biased to share more or fewer features by controlling the amount of boost given to certain features. This technique further reduces the total number of computations that would otherwise have to be performed to accomplish the same result, thus improving the computational performance of any system on which it is implemented.

Additional or alternative components and elements can be used in such a system in accordance with the various embodiments. Accordingly, it should be noted that additional services, providers, and/or components can be included in such a system, and although some of the services, providers, components, etc. are illustrated as being separate entities and/or components, the illustrated arrangement is provided as an example arrangement and other arrangements as known to one skilled in the art are contemplated by the embodiments described herein. The search system 400 may be implemented on one or more physical server computing devices that provide computing services and resources to users. In some embodiments, the search system 400 may be implemented on one or more host devices, such as blade servers, midrange computing devices, mainframe computers, desktop computers, or any other computing device configured to provide computing services and resources. For example, a single host device may execute one or more content servers, one or more group generators, various data stores, some combination thereof, etc. The content management system may include any number of such hosts. In some embodiments, the features and services provided by the search system 400 may be implemented as web services consumable via a communication network. In further embodiments, the content management system (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a cloud computing environment.

Individual user devices 404 may be any of a wide variety of computing devices, including personal computing devices, terminal computing devices, laptop computing devices, tablet computing devices, electronic reader devices, wearable computing devices, mobile devices (e.g., smart phones, media players, handheld gaming devices, etc.), and various other electronic devices and appliances. A user may operate a user device to access and interact with content managed by the search system 400. In some embodiments, a user may launch specialized application software, such as a mobile application executing on a particular user device, such as a smart phone or tablet computer. The application may be specifically designed to interface with the content management system for accessing and interacting with content. In some embodiments, a user may use other application software, such as a browser application, to interact with the search system.

Figure 5:
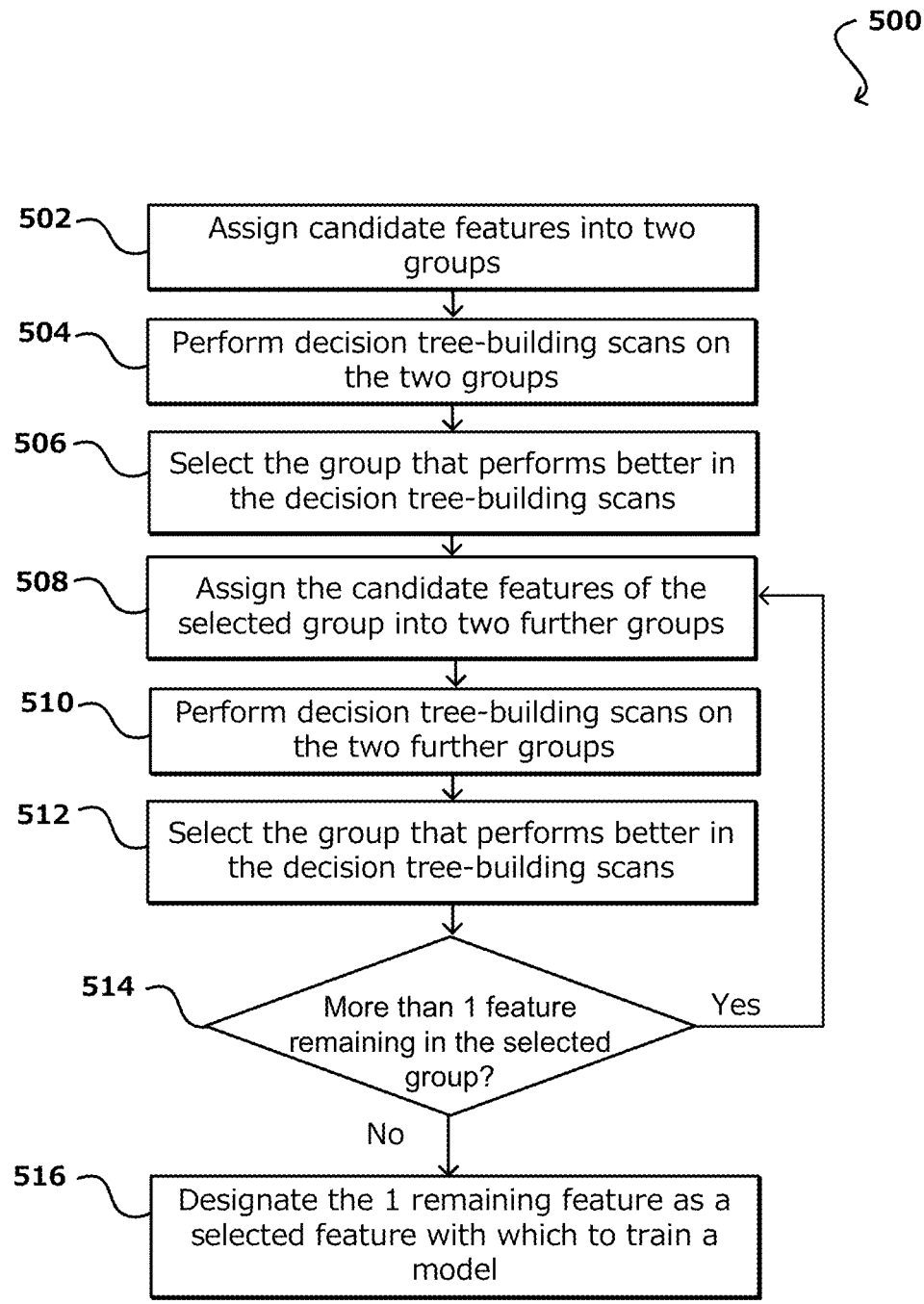
FIG. 5 is a flow chart illustrating a process for selecting a feature with which to train a search model, in accordance with various embodiments of the present disclosure.

FIG. 5 illustrates a flow chart 500 describing an example process for selecting a feature with which to train a search model, in accordance with various embodiments. It should be understood that, for any process discussed herein, there can be additional, fewer, or alternative steps performed in similar or alternative orders, or in parallel, within the scope of the various embodiments. In this example, a number of features are to be selected from a set of available candidate features in order to train a search model. To do so, the candidate features are assigned 502 into two different groups. In some embodiments, the candidate features are split as evenly as possible and randomly assigned to the two groups. Each of the two groups represents a summation of the respective features that were assigned to it. Each of the two groups represents a summation of the respective features that were assigned to it. A group containing a plurality of feature is treated as a feature that includes all of the features that were assigned to that group. Decision tree-building scans are then performed 504 on the two groups to determine which of the two groups performs better based on one or more selection criteria. For example, in some embodiments, the selection criteria may include a mean squared error metric. Essentially, the scans are used to determine which of the two groups represents a better feature to use in a decision tree model. Out of the two groups, the group that performs better in the decision tree-building scans is selected 506. The candidate features in the selected group are then assigned 508 into two further groups. As before, the candidate features may be divided as evenly as possible between the two further groups and randomly assigned. Decision tree-building scans are again performed 510 on the two groups to determine which of the two further groups performs better. Again, out of the two further groups, the group that performs better in the decision tree-building scans is selected 512. The candidate features may be continuously split into two groups with the better performing group being selected and further split, until there is one feature left in the better performing group. For example, a determination 514 may be made on whether there is more than one feature remaining in the selected group. If there is not more than one feature remaining, then the one remaining feature in the selected group is designated 516 as a selected feature with which to train the model. If there is more than one feature in a selected group, then the process is reiterated and the candidate features in the selected group are assigned 508 into two further groups. This binary splitting and scanning pattern is continuously performed until the selected group contains one remaining feature. That remaining feature is then designated as a selected feature to be used in the search model.

A plurality of features may be selected this way. Specifically, all of the other unselected candidate features are recombined and then again put through this binary splitting and scanning process to select another feature. This process is repeated until the target number of features has been selected. For example, this process is repeated twenty times to select twenty features to use in the search model. The selected features are then used to train the search model. The same features are also used at run time to process a query and return search and/or ranking results using the model. In some embodiments, to train a model using the selected features, a plurality of training data is accessed and dimensionality reduction is performed on the training data using the selected features in order to reduce the amount of information corresponding to the selected features. The model is then trained using the dimensionally reduced training data. In some embodiments, the training data includes historical information of searches conducted by users and their engagement with the search results, as well as attributes of the search results and user data. For example, a data point in the training data may be a search conducted by a user with the a certain search term, the search results that the user clicked on, saved, added to cart, purchased, etc., and information about those search results, such as price, description, availability, images, etc. The data point may also include the user's demographic data, general engagement behavior, and the like. The training data may include a large number of such data points, so that the model can be trained to optimize for user engagement. The model may also be continuously retrained with updated training data on a regular basis (e.g., every week, every month). The model may also be retrained upon certain triggers, such as newly added products or markets, among other events.

Once the model is trained, it can be used to process search queries from users. For example, the model, or environment in which the model is implemented, may receive a search query and the model can determine on or more items from a database to provide as a search result in response to the search query based at least in part on the one or more selected features of the item. In some embodiments, the search query may be a text based query and the model is configured for text based queries. In some embodiments, the search query may be an image based query and the model is configured for image based queries. In some embodiments, the model is configured for both text and image based queries. Since the model is trained using only a small subset of the total possible features, the amount of time and computing resources required is much smaller than it would be otherwise. Similarly, since only the subset of features are taken in consideration when a live search query is received, the model can find the search results much faster, again reducing the amount of time and computing resources and also providing an improved user experience.

Figure 6:
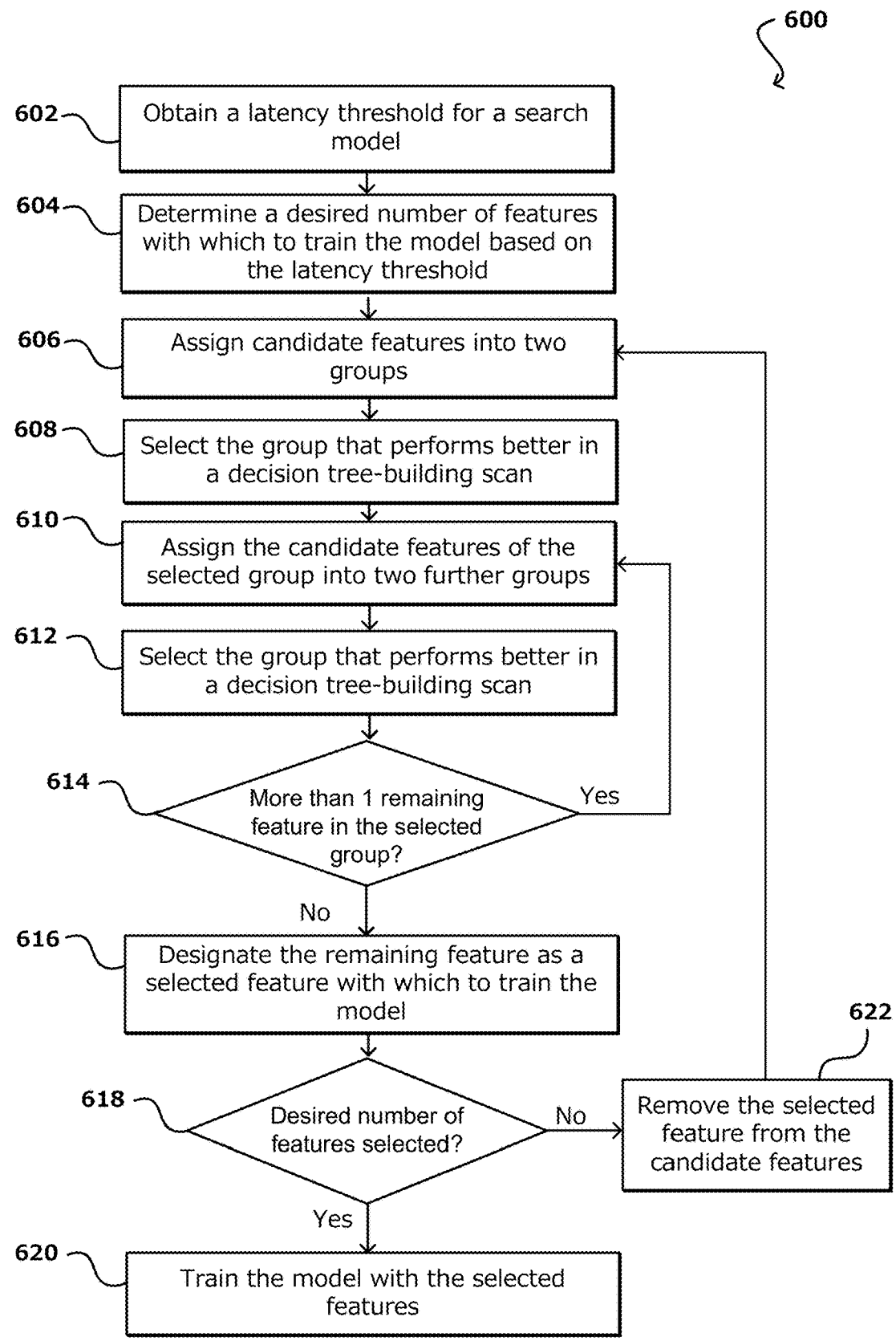
FIG. 6 is a flow chart illustrating a process for selecting a number of features with which to train a search model with latency constraints, in accordance with various embodiments of the present disclosure.

FIG. 6 illustrates a flow chart 600 describing an example process for selecting a number of features with which to train a search model with latency constraints, in accordance with various embodiments. In this example, a latency threshold for a search model may be obtained 602. A search model may be required to perform (e.g., serve search results in response to a search query) within a certain latency threshold. This may be important for user experience reasons among other reasons. The latency threshold may be based on a certain amount of time permitted between submission of a search query by a user and providing search results to the user. For example, the latency threshold may be on the magnitude of millisecond. The latency threshold may be different for different applications. A target number of features with which to train the model can be determined 604 based at least in part on the latency threshold. Since each additional feature costs computing time, the number of features that can be used may be bound by the latency threshold. In some embodiments, the target number of feature is the maximum number of features that is permitted by the latency threshold. In some embodiments, the target number of features may be less than the maximum number of features.

To select features, the candidate features are assigned 606 into two different groups. Decision tree-building scans are then performed on the two groups. Out of the two groups, the group that performs better in the decision tree-building scans is selected 608. The candidate features in the selected group are then assigned 610 into two further groups. Decision tree-building scans are again performed on the two groups and the group that performs better in the decision tree-building scans is selected 612. The candidate features may continue to be split into two groups with the better performing group being selected and further split, until there is only one feature left in the better performing group. A determination 614 may be made on whether there is more than one feature remaining in the selected group. If there is not more than one feature remaining, then the one remaining feature in the selected group is designated 616 as a selected feature with which to train the model. If there is more than one feature in a selected group, then the process is reiterated and the candidate features in the selected group are assigned 610 into two further groups. This binary splitting and scanning pattern is repeatedly performed until the winning group contains one remaining feature. The remaining feature is then designated 616 as a selected feature to be used in the search model.

The process may be repeated to select the target number of features. Specifically, it may be determined 618 whether the target number of features has been selected. If the target number of features has been selected, then the feature selection process is complete and the model can be trained 620 using the selected features. If the target number of features has not been reached, then the previously selected feature is removed 622 from the plurality of candidate features and the process reiterates to select at least one more feature from the remaining unselected candidate features. Specifically, the remaining candidate features, which does not include any previously selected features, is assigned 606 into two groups and the abovedescribed binary splitting is performed until another feature is selected. This is repeated until the target number of features has been selected, and the model is then trained 620 using the target number of selected features.

In some embodiments, the model may start to be trained prior to step 620 and before the target number of features has been selected. Training may begin as soon as one or more features are selected, using the one or more features that have already been selected. As more features are selected, the training may be updated to include those features. In some embodiments, training the model includes testing the model for accuracy. In some cases, a portion of the training data may be designated as testing data. It may be the case that the model reaches an adequate level of accuracy before the target number of features has been selected. In that case, feature selection may be halted and the features that were selected at that point are used for the model.

Figure 7:
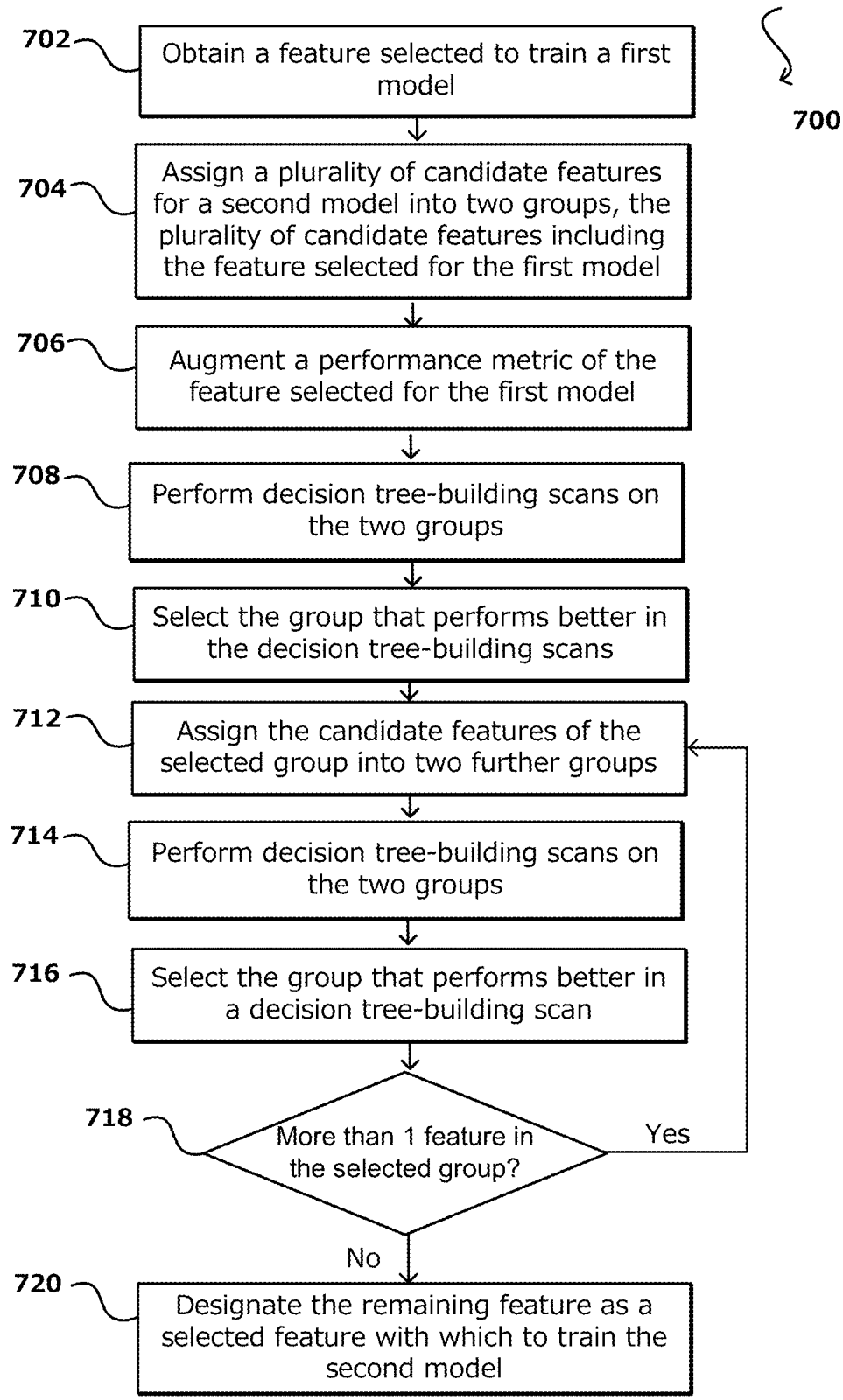
FIG. 7 is a flow chart illustrating a process for using a selected feature for a first model to aid in selecting features for a second model, in accordance with various embodiments of the present disclosure.

FIG. 7 illustrates a flow chart 700 describing an example process for using a selected feature for a first model to aid in selecting features for a second model, in accordance with various embodiments. As mentioned, a complicating factor in feature selection is that the best features may not be consistent across different search categories or geographic markets. A single global search model using a certain set of selected features may not generalize across different markets (e.g., product categories, geography). Present embodiments encourage feature sharing across markets to reduce the total amount of feature scanning required in training the models. In this example, a feature selected for training a first model is obtained 702. The first model may be associated with a first market. A plurality of candidate features for a second model are assigned 704 into two different groups. The second model is associated with a second market different from the first market. The candidate features for the second model may be the same set of features as the candidate features of the first model, or different with overlapping features. The candidate features for the second model at least includes the feature selected for the first model.

For example, price may be an important feature across all geographic markets and most product categories, and thus should be shared across those models. However, whether that feature is actually shared depends on whether that features also performs well in decision tree-building scans for the second model. Specifically, a decision tree-building performance metric of the feature selected for the first model is augmented 706 to increase the likelihood that it will end up as a selected feature for the second model. However, the augmented metric is not enough to force the feature to be selected if it has low performance and should not be used as a feature in the second model. The amount of augmentation can be determined based on how aggressively the features are to be shared. Decision tree-building scans are performed 708 on the two groups and the group that performs better in the decision tree-building scans is selected 710. Since the feature that was already selected for the first model is given an advantage (e.g., augmented metric), the scan is biased to select the group that has that feature as the better performing group. However, the selected group may or may not be the one having the feature selected for the first model. For example, the other group may be selected if another feature is highly important for that market and it is in a different group than the feature selected for the first model. Regardless, the candidate features in the selected group are assigned 712 into two further groups. Decision tree-building scans are again performed 714 on the two further groups and the group that performs better in the decision tree-building scans is selected 716. At each iteration, it is determined 718 whether there is more than one feature remaining in the selected group. If there is only one feature remaining in the selected group, the remaining feature is designated 720 as a selected feature for the second model. If there is more than one feature left, the feature are further assigned to two different groups and scanned until one feature remains and is designated 720 as a selected feature for the second model.

Figure 8:
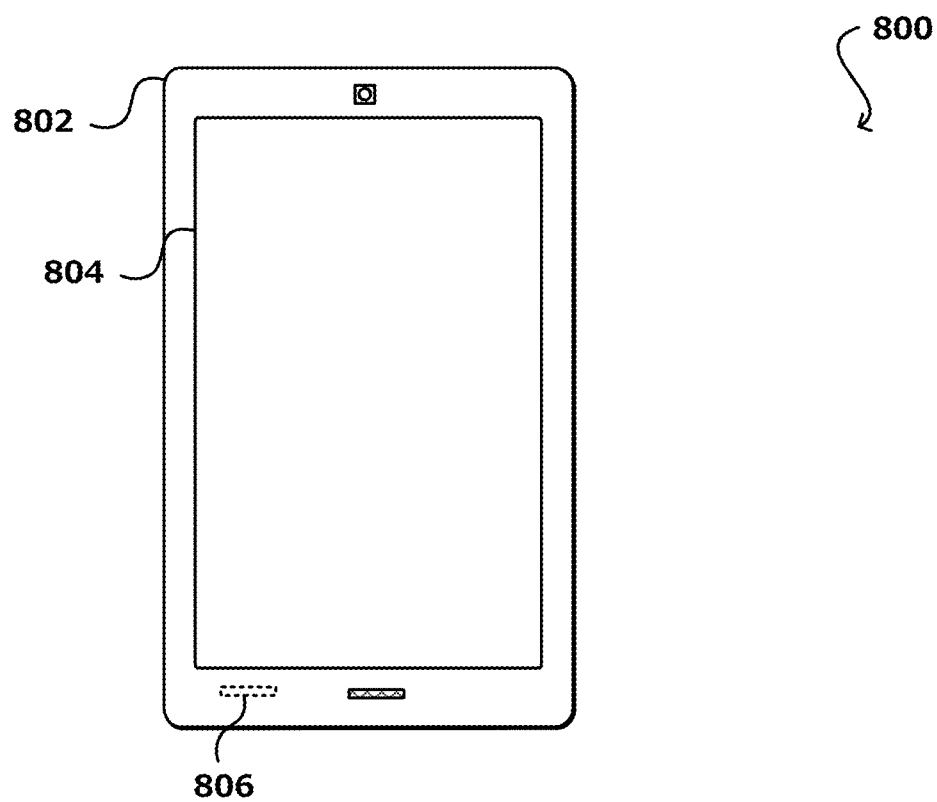
FIG. 8 illustrates an example computing device that can be used in accordance with various embodiments of the present disclosure.

FIG. 8 illustrates an example computing device 800 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others. In this example, the computing device 800 has a display screen 804 and an outer casing 802. The display screen under normal operation will display information to a user (or viewer) facing the display screen (e.g., on the same side of the computing device as the display screen). As discussed herein, the device can include one or more communication components 806, such as may include a cellular communications subsystem, Wi-Fi communications subsystem, BLUETOOTH® communication subsystem, and the like.

Figure 9:
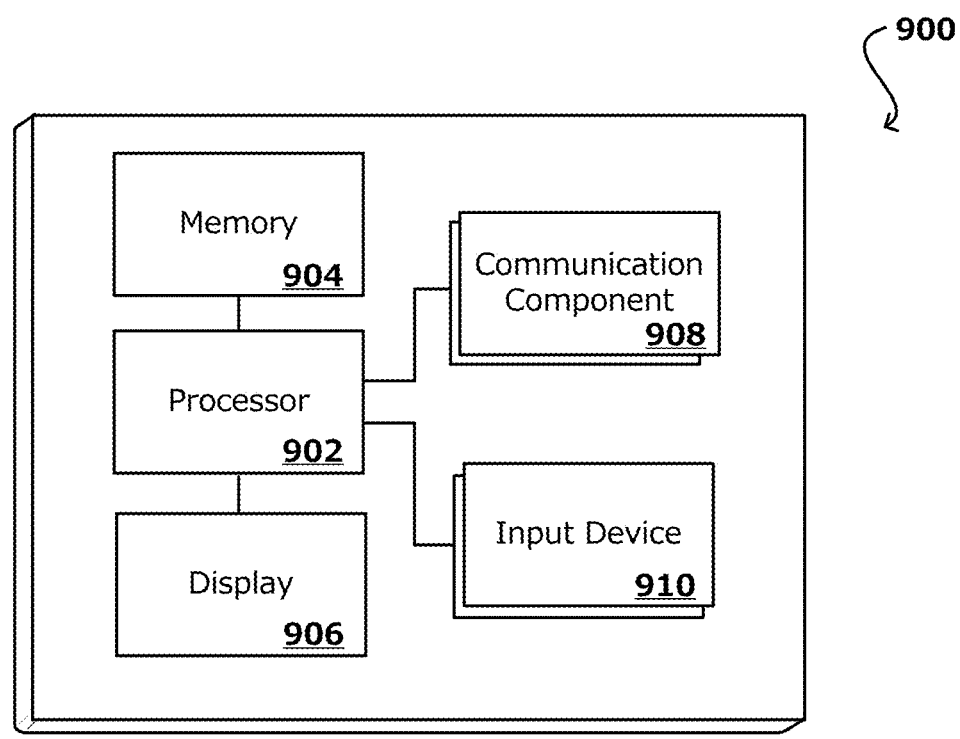
FIG. 9 illustrates a set of basic components of one or more devices that can be used in accordance with various embodiments of the present disclosure.

FIG. 9 illustrates a set of basic components of one or more devices 900 of the present disclosure. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device typically will include at least one type of display element 906, such as a touch screen, electronic ink (e-ink), organic light emitting diode (OLED) or liquid crystal display (LCD), although devices such as portable media players might convey information via other means, such as through audio speakers. The device can include at least one communication component 908, as may enabled wired and/or wireless communication of voice and/or data signals, for example, over a network such as the Internet, a cellular network, a Wi-Fi network, BLU-ETOOTH®, and the like. The device can include at least one additional input device 910 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device. As discussed, different approaches can be implemented in various environments in accordance with the described embodiments.

Figure 10:
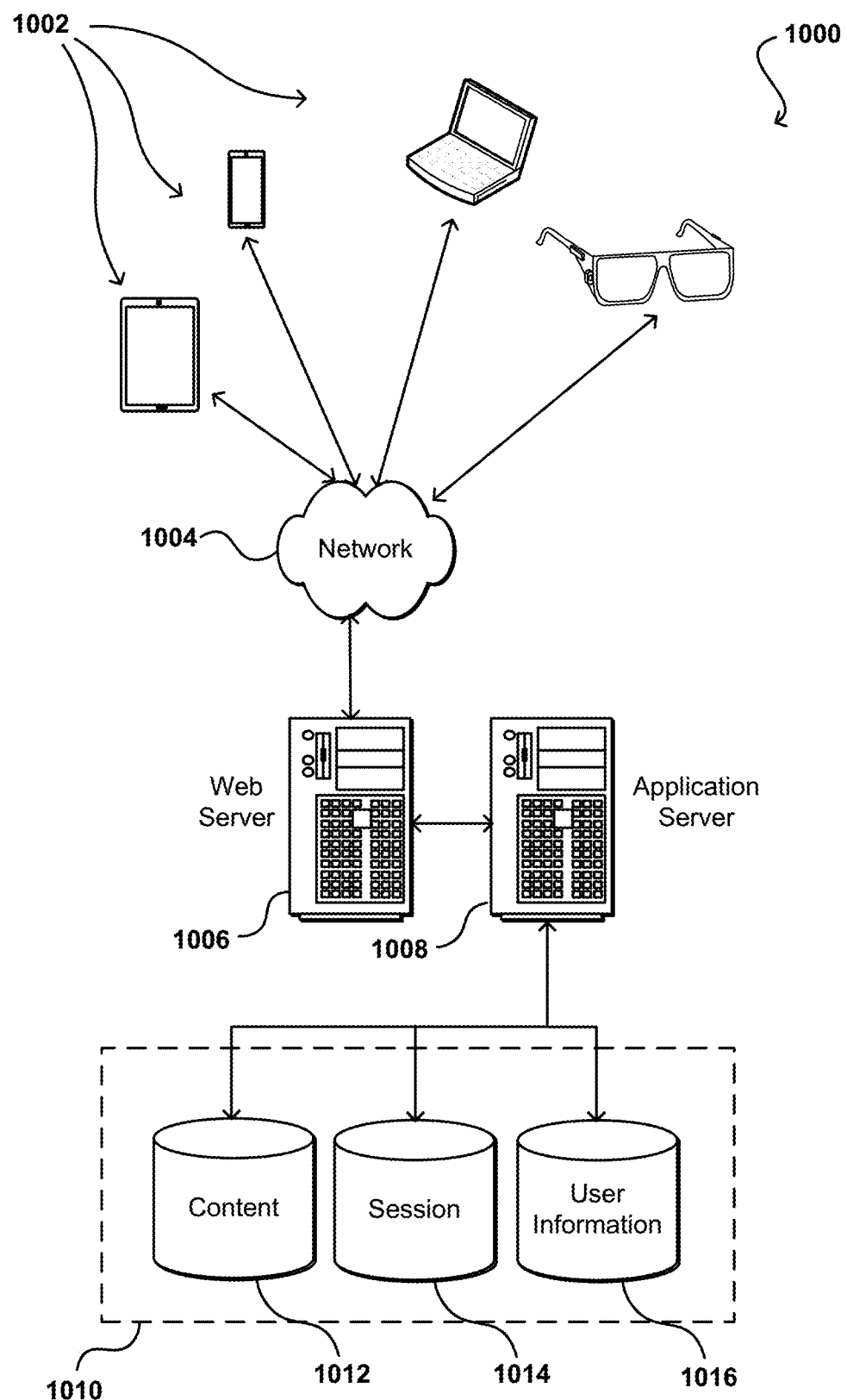
FIG. 10 illustrates an example environment for implementing aspects in accordance with various embodiments of the present disclosure.

FIG. 10 illustrates an example environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term data "store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser. Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure. The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc. Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information.

The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed. Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the target information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   determining a latency threshold for a search model;
   determining a target number of features, out of a plurality of candidate features, on which to train the search model based at least in part on the latency threshold, wherein the plurality of candidate features describe attributes of items in a database;
   dividing the plurality of candidate features into two groups, the two groups representing a summation of the respectively assigned candidate features;
   performing a first decision tree building scan using a first group of the two groups as a decision node in the search model;
   performing a second decision tree building scan using a second group of the two groups as the decision node in the search model;
   selecting a group from the two groups based on the selected group, when used as the decision node in the search model, producing results with lower error;
   continuing to split the candidate features of the selected group into two subsequent groups, perform decision tree-building scans, and select a group of the two subsequent groups based on results of the scans until the selected group includes one remaining feature;
   selecting the one remaining feature as a model training feature;
   removing the selected feature from the plurality of candidate features; and
   selecting additional features to be model training features until the number of model training features reaches the target number of features.

2. The computer-implemented method of claim 1, further comprising:
   obtaining a second plurality of candidate features from which a second subset of features are to be selected for training a second model, the second plurality of candidate features including at least the selected feature;

assigning the second plurality of candidate features into two second groups;

augmenting a performance metric of the selected feature for decision tree-building scans;

performing decision tree-building scans on the two second groups;

selecting a group from the two second groups based on scores of the decision tree-building scans;

continuous splitting the candidate features of the selected group into two subsequent second groups and select the group of the two subsequent second groups that obtains a better score until the selected group includes a second one remaining feature; and designating the second one remaining feature as a selected feature for training the second model.

3. The computer-implemented method of claim 2, further comprising:

wherein the plurality of candidate features and the second plurality of candidate features share one or more features.

4. The computer-implemented method of claim 1, further comprising:

training the model using the selected model training features; and using the selected model training features to select items from the database to present as search results in response to a search query.

5. A computer-implemented method, comprising:

obtaining a plurality of candidate features from which a subset of features are to be selected for training a model, wherein the plurality of candidate features describe attributes of items in a database;

assigning the plurality of candidate features into at least two groups;

performing decision tree-building scans on the at least two groups, wherein during the decision tree-building scans, a respective group of the at least two groups is used as a decision node in the model;

selecting a group from the at least two groups based on the selected group producing results with lower error when used as a decision node in the model;

assigning the candidate features in the selected group into at least two subsequent groups;

performing subsequent decision tree-building scans on the at least two subsequent groups;

selecting a subsequent group from the at least two subsequent groups based on scores of the subsequent decision tree-building scans;

determining that the selected subsequent group includes one remaining candidate feature; and designating the one remaining feature as a selected feature for training the model.

6. The computer-implemented method of claim 5, further comprising:

removing the selected feature from the plurality of candidate features; and designating another feature from the remaining plurality of candidate features as another selected feature for training the model.

7. The computer-implemented method of claim 6, further comprising:

determining a maximum number of selected features for training the model based on one or more performance criteria.

8. The computer-implemented method of claim 7, further comprising:

training the model with the maximum number of selected features.

9. The computer-implemented method of claim 7, further comprising:

training the model with fewer than the maximum number of selected features.

10. The computer-implemented method of claim 5, further comprising:

accessing a plurality of training data;

performing dimensionality reduction on the training data using at least the selected feature; and training the model using the dimensionally reduced training data.

11. The computer-implemented method of claim 10, further comprising:

receiving a search query; and determining, by the model, an item from the database to provide as a search result in response to the search query based at least in part on at least the selected feature of the item.

12. The computer-implemented method of claim 10, wherein the search query includes text, an image, or both.

13. The computer-implemented method of claim 5, further comprising:

obtaining a second plurality of candidate features associated with a second model from which a second subset of features are to be selected for training the second model, the second plurality of candidate features including at least the selected feature;

assigning the second plurality of candidate features into at least two groups associated with the second model;

augmenting a performance metric of the selected feature;

performing decision tree-building scans on the at least two groups associated with the second model;

selecting a group from the at least two groups associated with the second model based on scores of the decision tree-building scans;

assigning the candidate features in the selected group into at least two subsequent groups associated with the second model;

performing subsequent decision tree-building scans on the at least two subsequent groups associated with the second model;

selecting a subsequent group from the at least two subsequent groups associated with the second model based on scores of the subsequent decision tree-building scans;

determining that the selected subsequent group includes one remaining candidate feature; and designating the one remaining feature as a selected feature for training the second model.

14. The computer-implemented method of claim 13, wherein the second model is associated with a different product category or geographic market than the model.

15. The computer-implemented method of claim 13, wherein the subset of features selected for training the model has at least one feature in common with the second subset of features selected for training the second model.

16. A system, comprising:

at least one processor; and memory including instructions that, when executed by the at least one processor, cause the system to:

obtain a plurality of candidate features from which a subset of features are to be selected for training a model, wherein the plurality of candidate features describe attributes of items in a database;

assign the plurality of candidate features into at least two groups;
perform decision tree-building scans on the at least two groups, wherein during one of the decision tree-building scans, one of the at least two groups is used as a decision node in the model;
select a group from the at least two groups based on the selected group producing results with lower error when used as a decision node in the model;
assign the candidate features in the selected group into at least two subsequent groups;
perform subsequent decision tree-building scans on the at least two subsequent groups;
select a subsequent group from the at least two subsequent groups based on scores of the subsequent decision tree-building scans;
determine that the selected subsequent group includes one remaining candidate feature; and
designate the one remaining feature as a selected feature for training the second model.

17. The system of claim 16, wherein the instructions when executed further cause the system to:
remove the selected feature from the plurality of candidate features; and
designate another feature from the remaining plurality of candidate features as another selected feature for training the model.

18. The system of claim 16, wherein the instructions when executed further cause the system to:
access a plurality of training data;
perform dimensionality reduction on the training data using one or more selected features; and
train the model using the dimensionally reduced training data.

19. The system of claim 18, wherein the instructions when executed further cause the system to:
receive a search query; and
determine, by the model, an item from the database to provide as a search result in response to the search query based at least in part on the one or more selected features of the item.

20. The system of claim 16, wherein the instructions when executed further cause the system to:
obtain a second plurality of candidate features associated with a second model from which a second subset of features are to be selected for training the second model, the second plurality of candidate features including at least the selected feature;
assign the second plurality of candidate features into at least two groups associated with the second model;
augment a performance metric of the selected feature;
perform decision tree-building scans on the at least two groups associated with a second model;
select a group from the at least two groups associated with a second model based on scores of the decision tree-building scans;
assign the candidate features in the selected group into at least two subsequent groups associated with a second model;
perform subsequent decision tree-building scans on the at least two subsequent groups associated with a second model;
select a subsequent group from the at least two subsequent groups associated with a second model based on scores of the subsequent decision tree-building scans;
determine that the selected subsequent group includes one remaining candidate feature; and
designate the one remaining feature as a selected feature for training the second model.

\* \* \* \* \*